United States Patent [19]

Stewart

[11] Patent Number: 5,446,992
[45] Date of Patent: Sep. 5, 1995

[54] VERMIN BAIT STATION

[75] Inventor: Ronald J. Stewart, Marion Center, Pa.

[73] Assignee: Robobs, Inc., Marion Center, Pa.

[21] Appl. No.: 191,211

[22] Filed: Feb. 3, 1994

[51] Int. Cl.⁶ .................... A01M 25/00; A01M 1/20
[52] U.S. Cl. .................................................... 43/131
[58] Field of Search .................... 43/131, 61, 111

[56] References Cited

U.S. PATENT DOCUMENTS

| | | | |
|---|---|---|---|
| 1,393,590 | 10/1921 | Vaden | 43/131 |
| 2,683,953 | 7/1954 | Hopkins | 43/131 |
| 3,286,872 | 11/1966 | Burdick | 43/131 |
| 3,643,371 | 2/1972 | Gordon . | |
| 3,965,609 | 6/1976 | Jordan . | |
| 4,182,070 | 1/1980 | Connelly | 43/131 |
| 4,261,132 | 4/1981 | Carothers | 43/131 |
| 4,453,337 | 6/1984 | Williams . | |
| 4,483,095 | 11/1984 | Webinger . | |
| 4,541,198 | 9/1985 | Sherman . | |
| 4,570,377 | 2/1986 | Primavera . | |
| 4,619,071 | 10/1986 | Willis . | |
| 4,648,201 | 3/1987 | Sherman . | |
| 4,730,412 | 3/1988 | Sherman . | |
| 4,825,581 | 5/1989 | Dailey . | |
| 5,044,111 | 9/1991 | Lindros, Jr. . | |
| 5,175,957 | 1/1993 | West . | |

*Primary Examiner*—Kurt Rowan
*Attorney, Agent, or Firm*—Banner, Birch, McKie & Beckett

[57] ABSTRACT

A rodent bait station for the eradication of rats, mice and other rodents and vermin, which is safe for use around children, pets and other non-target species. The bait station includes an outer housing and an inner housing slidably movable with respect to the outer housing. The inner housing is movable between open, closed, and extended positions. When the inner housing is in the extended position, poisonous bait can be loaded into the bait station. When the inner housing is in the open position, rodents can access the poisonous bait located in the bait station. When the inner housing is in the closed position, the poisonous bait is substantially sealed within the bait station. The inner housing automatically moves from the open position to the closed position in response to being lifted off a supporting surface, thereby preventing the exposure of the poisonous bait to non-target species.

20 Claims, 5 Drawing Sheets

VERMIN BAIT STATION

FIELD OF THE INVENTION

This invention relates to a baiting device for delivering a poisonous feed to rodents that is particularly safe for non-target species. More specifically, this invention relates to a rodent bait station which automatically seals poisonous feed within the station upon being lifted off a supporting surface, thereby preventing the exposure of the poisonous feed to children and pets.

BACKGROUND OF THE INVENTION

Rodents, e.g., rats and mice, have been a curse on mankind for centuries. They bring pestilence and disease into major population centers and compete directly with mankind for food either by direct consumption or by fouling the stored materials with their droppings, dirt, and parasites.

There have been many solutions proposed in the past to control or reduce rodent populations. One proposed solution has been the rodent or mouse trap. Mouse traps typically include a spring-biased movable member which either crushes or encloses a rodent in response to the rodent contacting a trigger device with non-poisonous bait located thereon. Once crushed or enclosed, a user would then manually dispose of the rodent. While mouse traps may be useful in the removal of a single rodent, they remain generally ineffective in controlling larger rodent populations. Further, mouse traps pose great danger to children and pets who can severely injure themselves upon contacting the trigger device.

The most effective solution to control rodent populations to date has been the use of poisonous baits. Poisonous baits are very lethal and rodents consume the lethal bait as a food source and subsequently die. However, the use of poisonous bait, while highly effective, represents an inherent danger in that it can be touched or ingested by non-target species, e.g., humans, domestic animals, or pets, causing serious injury or death.

In the past, distribution of the poisonous bait was made in substantially open trays which contained the poisonous bait intended for the rodents. The trays were open and the poisonous bait was freely exposed so that children and domestic animals were often poisoned as a result of reaching into corners or other locations where such trays were placed with the intention that only rodents have access thereto. In addition, the poisonous bait within the open trays could also be spilled from the trays as a result of the actions of cleaning personnel unaware of the presence of the poisonous bait.

The open trays have generally been replaced by other containers, generally referred to as "bait stations". Bait stations are directed at allowing easy access for the target species and inhibiting access to the poisonous bait by larger, non-target species. In an attempt to accomplish these objectives, bait stations have utilized numerous different designs including limiting entrance sizes and/or incorporating maze-like constructions with horizontal or vertical baffles. These designs, while providing some protection to non-target species, are defective in many respects because the poisonous bait can still escape the bait station upon being lifted off a supporting surface and being shaken or otherwise moved. Further, many of these bait stations are costly to construct.

There is a need, therefore, for a bait station that will not only inhibit, but prevent, non-target species from contacting the poisonous bait used for rodent eradication, while at the same time, allowing rodents easy access to the poisonous bait.

SUMMARY OF THE INVENTION

It is therefore an object of the present invention to provide an inexpensive arrangement for containing poisonous bait which permits easy access by targeted species and prevents children and domestic animals from contacting the poisonous bait.

More specifically, it is an object of the invention to provide a bait station wherein the poisonous bait will automatically be sealed inside the bait station in response to being lifted off a supporting surface.

It is a further object of the invention to provide a bait station for rodent eradication which is inexpensive to construct and which is effective and safe to use in numerous environments, e.g., residential buildings, restaurants and industrial plants.

These and other objects are achieved by the present invention which, according to one aspect, provides a bait station having a first housing and a second housing which is telescopically movable with respect to the first housing. The second housing is movable between an open position where rodents may freely access the poisonous bait and a closed position where the poisonous bait is sealed within the bait station. The bait station also includes a biasing device and a retention member. The biasing device biases the second housing toward the closed position. The retention member retains the second housing in the open position against the biasing device when the bait station is resting on a supporting surface. When the bait station is lifted off the supporting surface, the retention member no longer prevents the movement of the second housing to the closed position and the biasing device automatically moves the second housing from the open position to the closed position.

In another aspect, the invention provides a bait station having a poisonous bait compartment, an access path and a path blocking member. Poisonous bait is placed in the poisonous bait compartment. The access path permits access of a targeted species to the poisonous bait compartment from an area outside the bait station. The path blocking member selectively blocks the access path. The path blocking member and the access path are relatively movable between first and second positions. When the path blocking member and the access path are in the first position, a target species can travel from outside the bait station to the poisonous bait compartment via the access path. When the path blocking member and the access path are in the second position, the access path is blocked and the poisonous bait is substantially sealed within the bait station. The relative movement of the path blocking member and the access path from the first position to the second position occurs automatically in response to the bait station being lifted off a supporting surface.

These and other objects and features of the invention will be apparent upon consideration of the following detailed description of preferred embodiments thereof, presented in connection with the following drawings in which like reference numerals identify like elements throughout.

DETAILED DESCRIPTION

Figure 1:
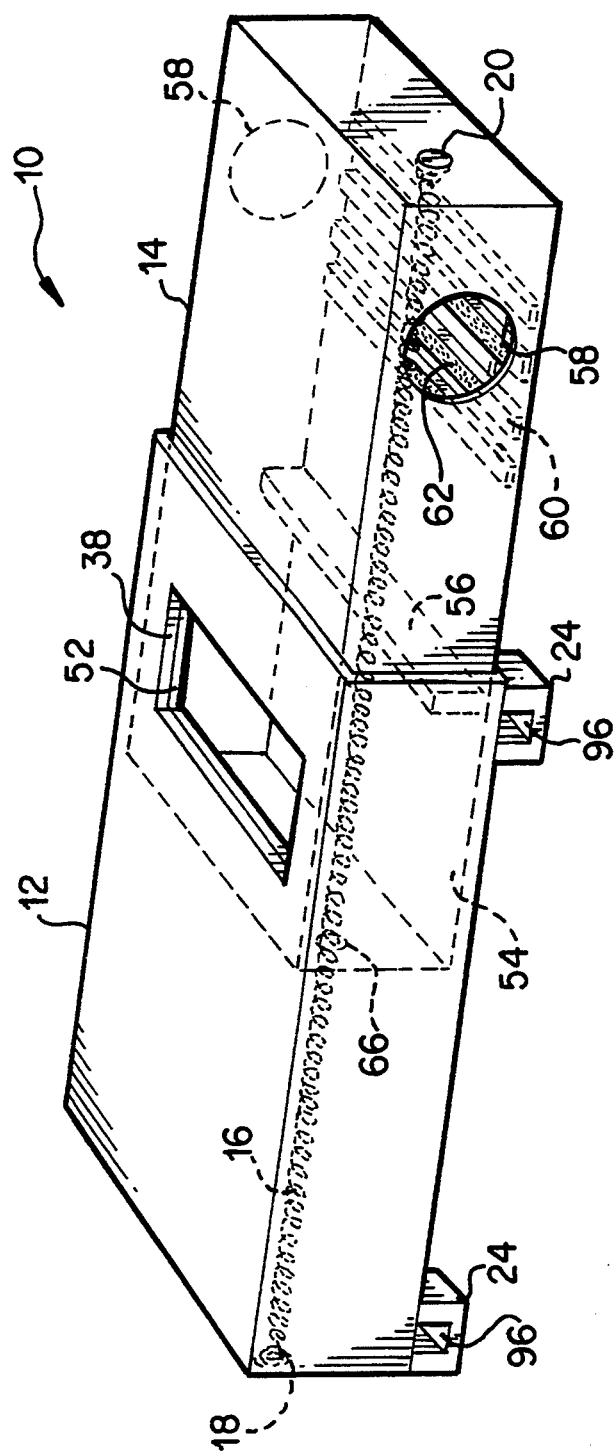
FIG. 1 is an isometric view of the bait station of the present invention shown in an extended position.

Referring to the figures, reference numeral 10 generally designates a rodent bait station embodying the present invention. As depicted in FIGS. 1 and 5–7, bait station 10 includes an outer housing 12 and an inner housing 14 which is telescopically movable with respect to outer housing 12. As described hereinafter, inner housing 14 is movable between extended (bait loading), open (rodent feeding), and closed (safety) positions; see FIGS. 5–7, respectively. A spring 16 is connected at one end 18 to outer housing 12 and to inner housing 14 at its other end 20. As described hereinafter, spring 16 biases inner housing 14 toward the closed or safety position as shown in FIG. 7.

Figure 2:
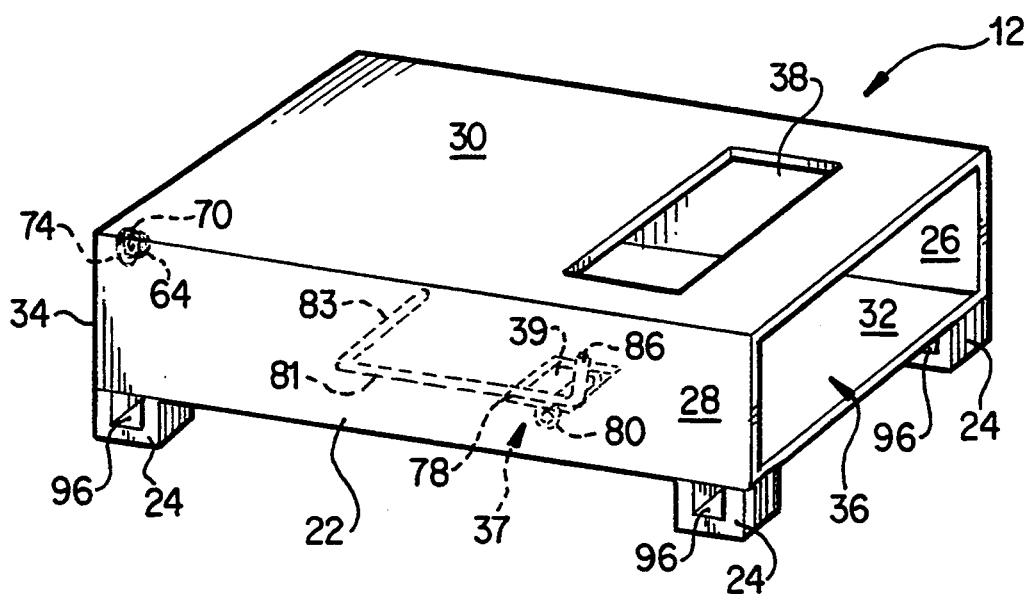
FIG. 2 shows a top isometric view of the outer housing of the bait station.
Figure 4:
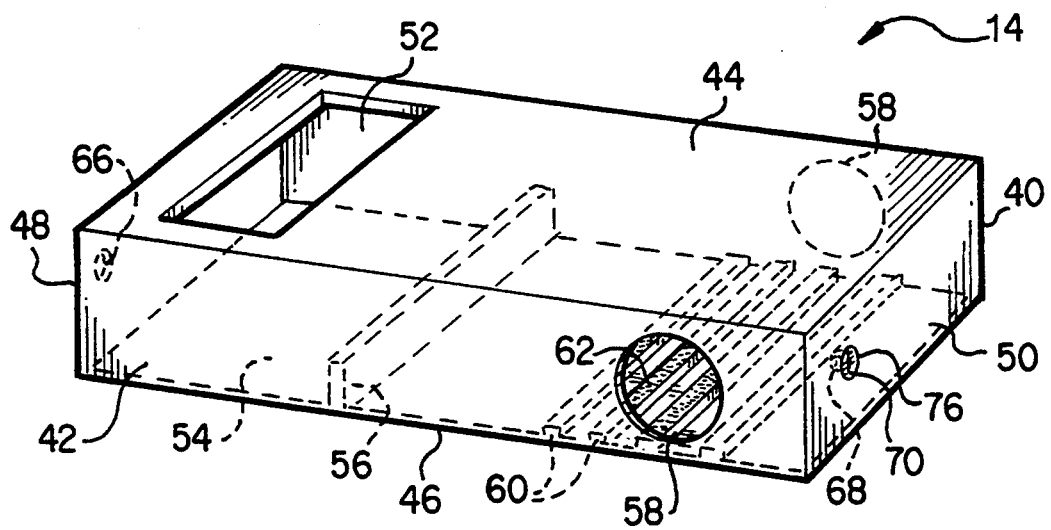
FIG. 4 shows a top isometric view of the inner housing of the bait station.
Figure 3:
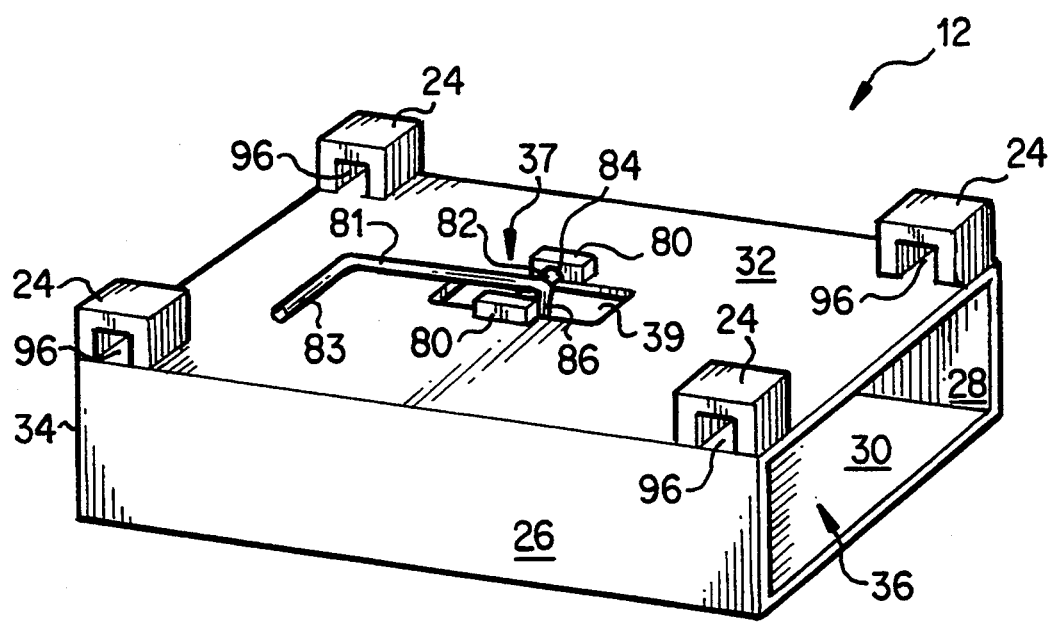
FIG. 3 shows a bottom isometric view of the outer housing of the bait station.

As illustrated in FIGS. 2 and 3, outer housing 12 includes a generally rectangular shaped box section 22 having supporting legs 24 mounted at the bottom corners thereof. Box section 22 includes a pair of opposing side walls 26 and 28, opposing top and bottom walls 30 and 32, a rear wall 34, and an open front section 36 opposed from rear wall 34. Top wall 30 includes a loading hole 38 for loading poisonous bait, e.g., rodenticide, into bait station 10. For purposes described hereinafter, a retaining arrangement 37 is mounted to bottom wall 32. An access hole 39 is cut in bottom wall 32 to permit a portion of retaining arrangement 37 to extend into the interior of box section 22.

Figure 5:
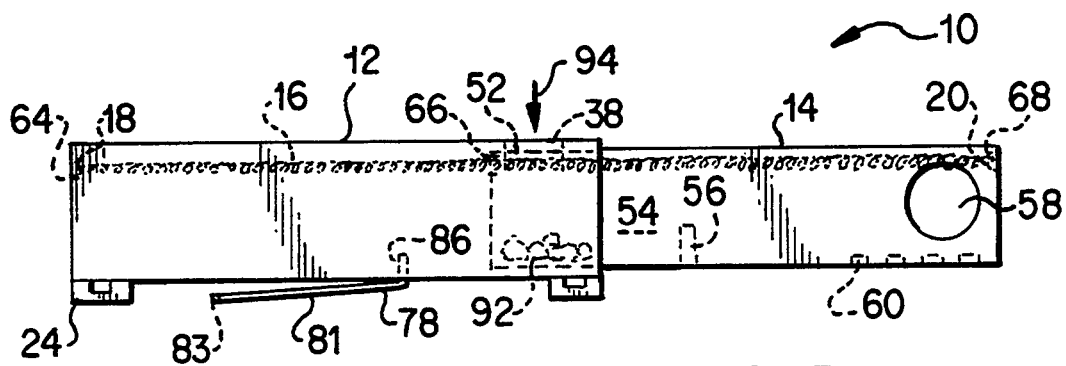
FIGS. 5–7 depict side elevational views of the bait station with the inner housing shown in extended, open, and closed positions, respectively.

Inner housing 14 is depicted in FIG. 5 and is slidably received in outer housing 12 through open front section 36. Inner housing 14 is shaped similar to the interior of outer housing 12 and includes opposing side walls 40 and 42, opposing top and bottom walls 44 and 46, and opposing rear and front walls 48 and 50. Top wall 44 also includes a loading hole 52 for loading poisonous bait into bait station 10.

A bait holding trough 54 is located in the rear portion of inner housing 14 for holding the poisonous bait for consumption by rats, mice, or other target species. Trough 54 is defined at its sides by the rear portion of side walls 40 and 42, at its rear by rear wall 48, and at its front by a barrier ridge 56. Ridge 56 inhibits the egress of the poisonous bait from trough 54, while permitting access thereto by the targeted species.

Adjacent their forward ends, side walls 40 and 42 of inner housing 14 each includes a rodent access hole 58 which permits rodents to enter inner housing 14 and access the poisonous bait in trough 54. Rodent access holes 58 should be sized large enough to permit access by the target species, but otherwise, as small as possible to prevent a child from inserting a hand through hole 58 and accessing the poisonous bait in trough 54.

Bottom wall 46 of inner housing 14 includes a rodent feet wiping arrangement comprised of a plurality of feet wiping bars 60. Feet wiping bars 60 are located in the path from rodent access holes 58 to bait holding trough 54. Rodents travelling from trough 54 are forced to travel over feet wiping bars 60 to exit inner housing 14 via rodent access holes 58. Feet wiping bars 60 inhibit rodents, who have gotten poisonous bait on their feet, from tracking the bait out of feed station 10. Any poisonous bait on a rodent's feet should scrape off when the rodent walks on bars 60 in a manner similar to wiping shoes on a door mat. Bars 60 preferably include a roughed up or textured upper surface 62 to increase their effectiveness. In FIGS. 4–7, four feet wiping bars 60 are shown. However, it should be recognized the number of feet wiping bars 60 can be varied as long as the number of bars 60 chosen fulfills the purpose of inhibiting the escape of poisonous bait from inner housing 14.

Figure 6:
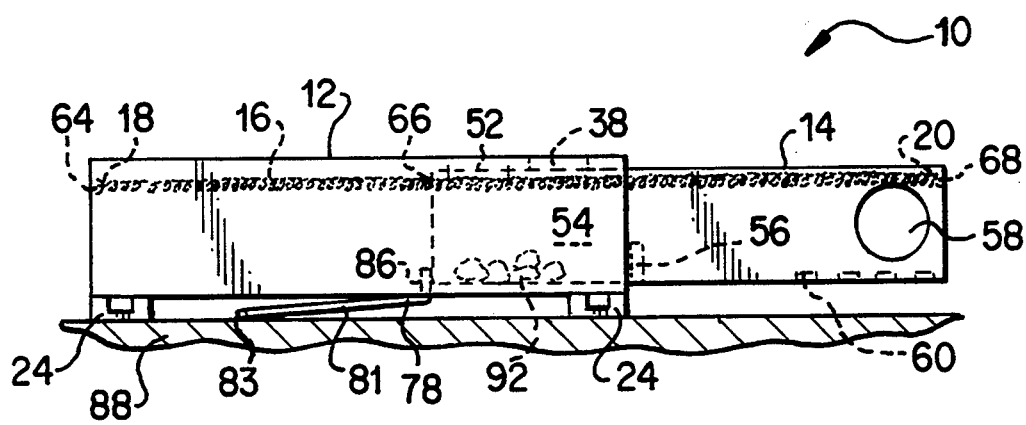
Figure 7:
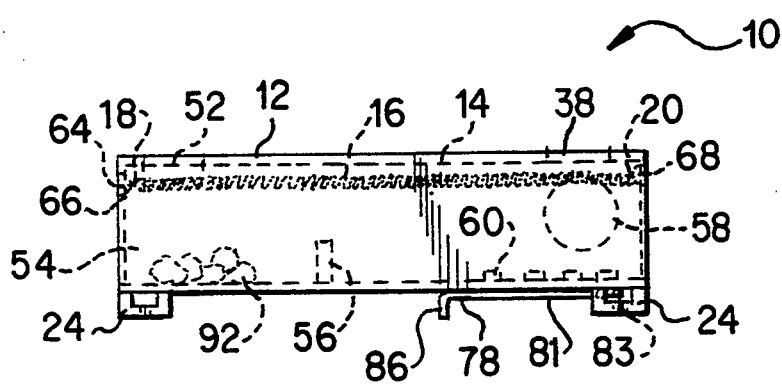

As best shown in FIGS. 5–7, spring 16: (i) is attached at one end 18 to a hook 64 on the inside of rear wall 34 of outer housing 12, (ii) passes through a hole 66 in rear wall 48 of inner housing 14, and (iii) is attached at the other end 20 to a hook 68 on the inside of front wall 50 of inner housing 14. Hole 66 and hooks 64 and 68 are preferably vertically and horizontally aligned to prevent spring 16 from encountering undesirable interference or friction from hole 66.

Figure 8:
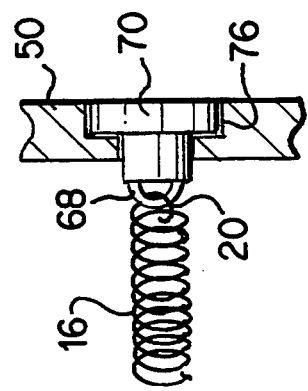
FIG. 8 shows a cross-sectional view of the interfacing structure between the biasing spring and a housing wall.

To facilitate assembly of spring 16 to housings 12 and 14, rear wall 34 of outer housing 12 and/or front wall 50 of inner housing 14 include a contoured hole 74 and 76 therein permitting spring 16 to be pulled therethrough. As illustrated in FIG. 8, a contoured removable wall insert 70 is placed in each hole 74 and 76. Each insert 70 includes an eyelet 64 or 68 and has surfaces which are generally complementary to holes 74 or 76.

Figure 10:
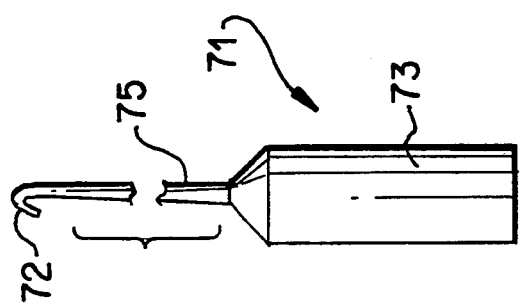
FIG. 10 is an elevational view of an assembly tool for the installation of the spring.

To attach spring 16, one end 18 (or 20) must be attached to its respective eyelet 64 (or 68) and the other or free end 20 (or 18) must be routed through hole 66 in rear wall 48 and through contoured hole 76 (or 74). The routing of spring 16 can be facilitated by using a spring assembly device which can hook onto free end 20 (or 18) of spring 16 and guide it through holes 66 and 76 (or 74). A spring assembly device 71 is pictured in FIG. 10 and includes an elongated shaft 75, a spring holding member 72, and a handle 73. Once pulled through hole 76 (or 74), free end 20 (or 18) of spring 16 can be attached to its respective eyelet 68 (or 64) on insert 70. When released, spring 16 retracts and holds insert 70 in place against its respective housing wall 50 (or 34), in addition to biasing inner housing 14 into the closed or safety position. Elongated shaft 75 and spring holding member 72 must be sized to permit entry through holes 66 and 76 (or 74).

Figure 11:
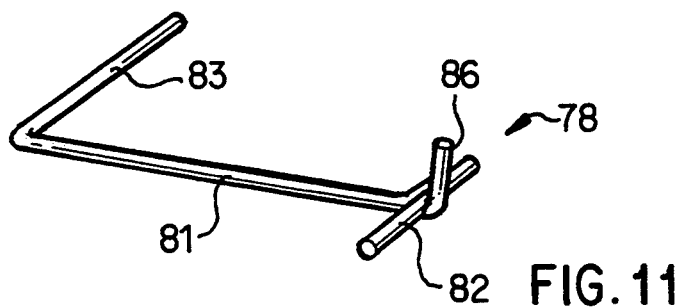
FIG. 11 is an isometric view of the retention member for retaining the inner housing in the open position when the bait station is resting on a supporting surface.

Retaining arrangement 37 includes a retention member 78 and two retention member hinging brackets 80. As shown in FIG. 11, retention member 78 has a transverse pivot member or axle 82, a transverse floor contacting portion 83 at the end of a longitudinal extension arm 81 on one side of pivot member 82, and a stopping arm 86 on the other side of pivot member 82. Retention member hinging brackets 80 are attached to bottom wall 32 of outer housing 12 on both sides of retention member 78. Each retention member hinging bracket 80 contains a socket 84 therein to retain an end of pivot member 82 and permit relative pivotal motion between retention member 78 and outer housing 12.

Retention member 78 is pivotally movable between a loaded position (FIGS. 5 and 6) and an unloaded position (FIG. 7). In a loaded position, stopping arm 86 protrudes through access hole 39 and provides an abutting surface for rear wall 48 of inner housing 14, while longitudinal extension arm 81 extends away from pivot member 82 and floor contacting portion 83 provides an elongated surface area for contacting a supporting surface 88. When retention member 78 is in the loaded position and bait station 10 is placed on supporting surface 88, as shown in FIG. 6, retention member 78 prevents inner housing 14 from moving to its closed position because the counter-clockwise force applied to stopping arm 86 by spring 16 retracting inner housing 14 is balanced by supporting surface 88 resisting the counter-clockwise motion of floor contacting portion 83.

Stopping arm 86 and longitudinal extension arm 81 are preferably about 90° apart permitting the simultaneous contact of floor contacting portion 83 with supporting surface 88 and stopping arm 86 with rear wall 48 of inner housing 14. However, it is recognized that other angular relationships may be used to achieve the same result. In addition, the weight of bait station 10 must be at least equal to the downward force exerted by floor contacting portion 83 due to the force of spring 16, to prevent bait station 10 from lifting off support surface 88.

Figure 9:
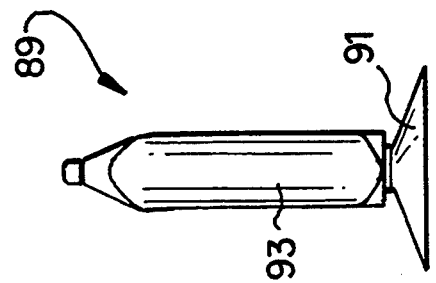
FIG. 9 is an elevational view of a inner housing member opening device.

To assure that bait station 10 is child-proof, it is desirable to make inner housing 14 without any exterior handles or gripping surfaces so that once in the closed or safety position, inner housing 14 cannot be moved to the open or extended position without the use of a special opening tool. One such opening tool 89 is depicted in FIG. 9. Special opening tool 89 includes a handle 93 and a suction cup 91. To use tool 89, suction cup 91 is attached the smooth outside of front wall 50 of inner housing 14. Once suction cup 91 is attached, handle 93 is pulled against the biasing force of spring 16 to move inner housing 14 to either the open or extended position. Therefore, as inner housing 14 has no surfaces which can be gripped when front wall 50 is flush with or recessed within the confines of outer housing 12, i.e., when inner housing 14 is in the closed position, the poisonous bait will remain safely sealed inside bait station 10 until an adult desires to move inner housing 14 to the open or extended position with opening tool 89.

As bait station 10 is preferably made from a smooth plastic material, opening tool 89 is a preferred design. However, it should be recognized that other opening tools and opening systems could be used to make bait station 10 child-proof. It should also be recognized that if front wall 50 of housing 14 had an outer surface not conducive to accepting suction cup 91, another opening tool design, e.g., a key and slot arrangement, would be preferred.

In operation, initially supplying or replenishing the poisonous bait in trough 54 requires inner housing 14 to be moved to the extended or poisonous bait loading position (FIG. 5). If inner housing 14 is in the closed position (FIG. 7), inner housing 14 must be moved away from outer housing 12 until poisonous bait loading holes 38 and 52 are aligned. To impart such motion to inner housing 14, opening tool 89 is used in the manner previously described.

Once bait loading holes 38 and 52 are aligned, poisonous bait 92 may be placed into trough 54 through aligned loading holes 38 and 52 in the direction of arrow 94 (FIG. 5). Inner and outer housing 12 and 14 may also include small holes, not shown, which overlap when inner housing 14 is in the extended position. A small rod or dowel member, not shown, may be inserted into the overlapping holes to lock inner housing 14 in the extended position to facilitate the loading of poisonous bait 92 into trough 54.

Once the poisonous bait 92 has been placed in trough 54, inner housing 14 is ready to be moved to the open or rodent feeding position (FIG. 6). To accomplish this, the user must hold floor contacting portion 83 of retention member 78 in the loaded position and permit inner housing 14 to move rearwardly into its open position (abutting stopping arm 86) by the biasing force applied by spring 16. Bait station 10 is now set and ready to be placed on a supporting surface 88. The supporting surface 88 should be in an area infested by rodents, particularly along the walls in areas where rodents have been seen travelling. Once bait station 10 is sufficiently close to supporting surface 88, the user may release floor contacting portion 83 of retention member 78. Floor contacting portion 83 will rest against supporting surface 88 and prevent the rearward movement of inner housing 14 as long as the bait station is not lifted.

While in the rodent feeding position (FIG. 6), bait station 10 will remain on supporting surface 88 and rodents can enter access holes 58 and feed from the poisonous bait 92 in trough 54 at will. When a rodent has finished eating from poisonous bait 92, it will walk across feet wiping bars 60 and substantially all of the poisonous bait 92 on the rodent's feet will wipe off, inhibiting the tracking of poisonous bait 92 out of feed station 10. Rodents that ingest poisonous bait 92 subsequently perish.

In the event a child or a pet approaches bait station 10 in the open position and attempts to play with it, there is nothing to fear because poisonous bait 92 is inaccessible. First, a child's hand is too large to reach through rodent access holes 58 and reach trough 54. Similarly, domestic pets, e.g., dogs and cats, cannot access trough 54 access hole 58. Second, in the event that a child or pet tries to lift or tilt bait station 10, supporting surface 88 will no longer resist the counter-clockwise movement of floor contacting portion 83 and biasing device 16 will automatically move inner housing 14 into its closed position (FIG. 7). In the closed position, side walls 26 and 28 of outer housing 12 block holes 58 to substantially seal poisonous bait 92 within bait station 10. Further, with inner housing 14 in its closed position, bait station 10 is still child-proof because inner housing 14 cannot be moved to the open or extended position without opening tool 89.

Supporting legs 24 can optionally include holes 96 for the insertion of a stabilizer, not shown. A stabilizer preferably takes the form of an elongated rod member which can be inserted through two aligned holes 96. A stabilizer acts like an outrigger device, reducing the possibility of bait station 10 becoming inadvertently tipped.

In addition, holes 96 can be used with a chain or cable, not shown, and a lock, not shown, to prevent the theft of bait station 10. Holes 96 permit the insertion of a cable which preferably has loops at its ends. In a manner similar to a bicycle lock, the cable can be routed through holes 96 and around another and preferably immovable object. A lock prevents the loops from being separated except by an authorized user having the appropriate combination or key. Thus, bait station 10 can be anchored to another structure to prevent its unauthorized removal.

Inner and outer housings 12 and 14 may comprise known suitable materials such as plastics and metals, and be formed with conventional manufacturing techniques. Preferably, housings 12 and 14 are each formed of rigid plastic, e.g., a thermoplastic, and injection molded. In the alternative, housings 12 and 14 may be made of fused plastic sheet pieces, as the shapes of housings 12 and 14 are conducive to such a manufacturing technique, i.e., box shaped. If bait station 10 is intended to be used by the food industry, e.g., food processing plants, food storage facilities, or restaurants, it may be preferably that housings 12 and 14 are made of stainless steel.

If desired, outer and inner housings 12 and 14 may be made of overlapping wall portions of a transparent material. Overlapping transparent wall portions provide a viewing area so that trough 54 is observable when inner housing 14 is in the open or rodent feeding position. This permits a user to determine whether poisonous bait 92 needs to be replenished without having to move inner housing 14 to the extended position. In addition, outer housing 12 and/or inner housing 14 may be provided with warning labels or designs on the outside thereof to reduce the possibility of inadvertent tampering with the station 10.

Retention member 78 is preferably made from either a welded wire, which may be of 9/32" diameter, or a rigid plastic. The length of longitudinal extension arm 81 preferably varies as a function of the spring tensioning, the weight of bait station 10, and the height of stopping member 86, and in accordance with the desired closing speed and the desired height that bait station 10 must be lifted off the supporting surface 88 to automatically close. These parameters may be readily determined by one of ordinary skill in the art.

As previously described, the preferred biasing device for biasing inner housing 14 towards the closed position is spring 16. However, other biasing devices, e.g., rubber bands, could also be used in addition to, or in lieu of, spring 16 to provide an additional or substitute biasing force.

While the preferred embodiment includes housings telescopically movable with respect to each other, and the relative movement to safely seal the poisonous bait occurs upon the movement of a pivoted retention member, other embodiments are evident from the teachings herein. For example, arcuate housings could by pivotally movable with respect to each other. Further, a linearly movable retention member, e.g. , a plunger, could be used in lieu of a pivotally movable retention member. In addition, the poisonous bait could be safely sealed within a single housing by the movement of a sealing element mounted for linear or pivotal movement within the confines of the housing.

It is to be understood that the disclosed embodiments are merely illustrative of the principles of the present invention which could be implemented by other types of structures which would be readily apparent to those skilled in the art. In addition, while the bait station is described in accordance with the eradication of rodents, the present invention could be appropriately scaled and otherwise adapted for target species other than rats and mice, e.g., ants, cockroaches. Accordingly, the scope of the present invention is to be determined in accordance with the appended claims.

What is claimed is:

1. A bait station for holding poisonous bait for the eradication of a targeted species of vermin, the bait station comprising:
   a first housing;
   a second housing;
   an access opening in one of said first and said second housings for permitting access of the targeted species from an area outside the bait station to the poisonous bait; said second housing being movable in its entirety with respect to said first housing between:
      (i) a first position in which the targeted species may freely access the poisonous bait and
      (ii) a second position in which the poisonous bait is substantially sealed within the bait station;
   a biasing device biasing said second housing toward the second position; and
   a retention member for retaining the second housing in the first position against the biasing of the biasing device when the bait station is resting on a supporting surface;
   wherein said biasing device automatically moves said second housing from the first position to the second position in response to the bait station being lifted off the supporting surface.

2. The bait station of claim 1, wherein said access opening is in said second housing.

3. The bait station of claim 2, wherein said second housing further includes a targeted species feet cleaning arrangement proximate said access opening for inhibiting the tracking of poisonous bait out of the bait station.

4. The bait station of claim 1, wherein said second housing includes a barrier to form a containment area for containing the poisonous bait therein and inhibiting the escape of poisonous bait from the bait station.

5. The bait station of claim 1, ,wherein said second housing is further movable into a third position for loading poisonous bait into the bait station.

6. The bait station of claim 1, wherein said biasing device is a spring, said spring having first and second ends, said first end of the spring attached to the first housing and said second end of the spring attached to the second housing.

7. The bait station of claim 1, wherein said first housing includes supporting legs for supporting the bait station on the supporting surface.

8. The bait station of claim 1, wherein said first and second housings each include right and left side walls, said second housing further including said access opening in a side wall thereof, said access opening permitting the entry and exit of targeted species therethrough when said second housing is in the first position and said access opening being sealed off when said second housing is in the second position.

9. A bait station for holding poisonous bait for the eradication of a targeted species of vermin, the bait station comprising:
   a first housing;
   a second housing;
   an access opening in one of said first and said second housings for permitting access of the targeted species from an area outside the bait station to the poisonous bait;
   said second housing being movable with respect to said first housing between:

(i) a first position in which the targeted species may freely access the poisonous bait and (ii) a second position in which the poisonous bait is substantially sealed within the bait station;

a biasing device biasing said second housing toward the second position; and a retention member for retaining the second housing in the first position against the biasing of the biasing device when the bait station is resting on a supporting surface;

wherein said biasing device automatically moves said second housing from the first position to the second position in response to the bait station being lifted off the supporting surface, and said second housing is further movable into a third position for loading poisonous bait into the bait station;

wherein said bait station includes a poisonous bait containing area, said first housing includes a wall having a poisonous bait loading hole therein, wherein said poisonous bait can be loaded into the poisonous bait containing area through the poisonous bait loading hole when said second housing is in said third position and the loading of poisonous bait into the poisonous bait containing area through the poisonous bait loading hole is prevented when said second housing is in said first and second positions.

10. The bait station of claim 9, wherein said second housing includes a wall having a poisonous bait loading hole therein, said poisonous bait loading holes of the first and second housings being in at least partial alignment when said second housing is in said third position and being out of alignment when said second housing is in the first and the second positions.

11. The bait station of claim 10, wherein said poisonous bait loading hole of the first housing is in a top wall thereof and said poisonous bait loading hole of the second housing is in a top wall thereof.

12. A bait station for holding poisonous bait for the eradication of a targeted species of vermin, the bait station comprising:

a first housing;

a second housing;

an access opening in one of said first and said second housings for permitting access of the targeted species from an area outside the bait station to the poisonous bait;

said second housing being movable with respect to said first housing between:

(i) a first position in which the targeted species may freely access the poisonous bait and (ii) a second position in which the poisonous bait is substantially sealed within the bait station;

a biasing device biasing said second housing toward the second position; and a retention member for retaining the second housing in the first position against the biasing of the biasing device when the bait station is resting on a supporting surface;

wherein said biasing device is a spring, said spring having first and second ends, said first end of the spring attached to the first housing and said second end of the spring attached to the second housing, said biasing device automatically moves said second housing from the first position to the second position in response to the bait station being lifted off the supporting surface;

wherein said first housing includes a rear wall and said second housing includes front and rear walls, said rear wall of said second housing including a spring passage hole, the spring:

(i) being attached to the rear wall of the first housing at the first end of the spring, (ii) penetrating the spring passage hole in the rear wall of the second housing, and (iii) being attached to the front wall of the second housing at the second end of the spring.

13. A bait station for holding poisonous bait for the eradication of a targeted species of vermin, the bait station comprising:

a first housing;

a second housing;

an access opening in one of said first and said second housings for permitting access of the targeted species from an area outside the bait station to the poisonous bait;

said second housing being movable with respect to said first housing between:

(i) a first position in which the targeted species may freely access the poisonous bait and (ii) a second position in which the poisonous bait is substantially sealed within the bait station;

a biasing device biasing said second housing toward the second position; and a retention member for retaining the second housing in the first position against the biasing of the biasing device when the bait station is resting on a supporting surface;

wherein said biasing device automatically moves said second housing from the first position to the second position in response to the bait station being lifted off the supporting surface;

wherein said first housing includes a floor, said retention member being pivotally attached to the floor of said first housing.

14. The bait station of claim 13, wherein said retention member includes first and second portions, wherein said first portion contacts the supporting surface and said second portion contacts said second housing when said second housing is in the first position.

15. The bait station of claim 14, wherein the angle between first and second portions of the retention member is approximately 90°.

16. A bait station for holding poisonous bait for the eradication of a targeted species of vermin, the bait station comprising:

a first housing;

a second housing;

an access opening in one of said first and said second housings for permitting access of the targeted species from an area outside the bait station to the poisonous bait;

said second housing being movable with respect to said first housing between:

(i) a first position in which the targeted species may freely access the poisonous bait and (ii) a second position in which the poisonous bait is substantially sealed within the bait station;

a biasing device biasing said second housing toward the second position; and a retention member for retaining the second housing in the first position against the biasing of the biasing device when the bait station is resting on a supporting surface;

wherein said biasing device automatically moves said second housing from the first position to the second position in response to the bait station being lifted off the supporting surface;

wherein said second housing being recessed entirely within the confines of the first housing member when said second housing is in the second position and said second housing at least partially extending from the confines of the first housing member when said second housing is in the first position.

17. A bait station for holding poisonous bait for the eradication of a target species of vermin, the bait station comprising:

a poisonous bait compartment for containing poisonous bait therein;

an access path for permitting access of a targeted species from an area outside the bait station to the poisonous bait compartment, said access path including a hole in a wall surface of said bait station; and a path blocking member having a path blocking surface substantially parallel to said wall surface for selectively blocking the access path hole upon relative linearly slidable movement between said path blocking member and said access path hole from a first position in which a target species can travel from outside the bait station to the poisonous bait compartment through said access path hole to a second position for blocking the access path hole and substantially sealing the poisonous bait within the bait station;

wherein said relative linearly slidable movement occurs in response to the bait station being lifted off a supporting surface, said relative linearly slidable movement being in a direction substantially parallel to the supporting surface.

18. The bait station of claim 17, wherein said access path includes a feet wiping device for inhibiting the tracking of poisonous bait out of the bait station.

19. The bait station of claim 17, further including a biasing device for biasing said path blocking member and said access path towards the second position.

20. The bait station of claim 19, further including an arresting member, said arresting member preventing the biasing device from relatively moving the path blocking member and said access path into the second position when the bait station is located on a supporting surface.

* * * * *